(12) United States Patent
Graef et al.

(10) Patent No.: US 9,006,589 B2
(45) Date of Patent: Apr. 14, 2015

(54) CABLE BUSHING

(75) Inventors: Karl-Heinz Graef, Wiesenthied (DE); Alexander Barnickel, Pressig (DE)

(73) Assignee: Leoni-Bordnetz Systeme GmbH, Kitzingen (DE)

( * ) Notice: Subject to any disclaimer, the term of this patent is extended or adjusted under 35 U.S.C. 154(b) by 56 days.

(21) Appl. No.: 13/822,059

(22) PCT Filed: Aug. 24, 2011

(86) PCT No.: PCT/EP2011/004243
§ 371 (c)(1),
(2), (4) Date: Jun. 21, 2013

(87) PCT Pub. No.: WO2012/031690
PCT Pub. Date: Mar. 15, 2012

(65) Prior Publication Data
US 2013/0292911 A1   Nov. 7, 2013

(30) Foreign Application Priority Data

Sep. 11, 2010 (DE) .......................... 10 2010 045 146

(51) Int. Cl.
*H02G 3/22* (2006.01)
*F16L 5/10* (2006.01)
*H02G 15/013* (2006.01)

(52) U.S. Cl.
CPC .. *F16L 5/10* (2013.01); *H02G 3/22* (2013.01); *H02G 15/013* (2013.01)

(58) Field of Classification Search
CPC ............. H02G 3/22; H02G 3/24; H02G 3/28; H02G 3/30; H02G 3/36; B60R 16/0215; B60R 16/0207; B60R 16/022; F16L 5/10; F16L 5/00

USPC .......... 174/77 R, 11 BH, 14 BH, 650, 152 G, 174/153 G, 72 A, 152 R, 652, 663, 137 R, 174/148; 16/2.1, 2.2; 248/56; 277/606, 590, 277/602

See application file for complete search history.

(56) References Cited

U.S. PATENT DOCUMENTS 4,267,401 A * 5/1981 Wilkinson ................... 174/77 R
4,454,381 A * 6/1984 Ito et al. ...................... 174/77 R
(Continued)

FOREIGN PATENT DOCUMENTS

DE          29803091 U1    4/1998
DE          69714720 T2    4/2003
(Continued)

*Primary Examiner* — Angel R Estrada
(74) *Attorney, Agent, or Firm* — Laurence A. Greenberg; Werner H. Stemer; Ralph E. Locher (57) ABSTRACT

A cable bushing, in particular for a motor vehicle, for routing a cable harness having a plurality of electrical lines through a wall opening in a sealed manner. The cable bushing includes a dimensionally stable housing for insertion into the wall opening. The housing encloses a sealing member that is made of an elastic sealing material. The sealing member includes receiving devices or channels for individually routing the electrical lines in an axial direction. The cable bushing further has a pressure-providing element that exerts a compressive force on the sealing member, such that the sealing member encloses the electrical lines individually in a sealed manner and the sealing member is pressed radially against the housing to achieve a high level of impermeability to longitudinal water penetration. Additionally, pins may be provided to produce additional radial compressive forces.

17 Claims, 3 Drawing Sheets

(56) References Cited

U.S. PATENT DOCUMENTS

| | | | |
|---|---|---|---|
| 4,622,436 A * | 11/1986 | Kinnan | 174/77 R |
| 4,993,724 A | 2/1991 | Hauff | |
| 5,235,138 A * | 8/1993 | Shah et al. | 174/152 G |
| 5,278,357 A * | 1/1994 | Yamanashi | 174/77 R |
| 5,561,273 A * | 10/1996 | Yamanashi | 174/152 R |
| 6,150,608 A | 11/2000 | Wambeke et al. | |
| 6,875,926 B2 * | 4/2005 | Buekers et al. | 174/77 R |
| 7,087,838 B2 * | 8/2006 | Ferderer et al. | 174/153 G |
| 8,686,289 B2 * | 4/2014 | Burke et al. | 174/77 R |
| 2003/0010519 A1 | 1/2003 | Pieck | |
| 2007/0193766 A1 | 8/2007 | Hendershot et al. | |

FOREIGN PATENT DOCUMENTS

| | | |
|---|---|---|
| DE | 10162813 A1 | 7/2003 |
| EP | 0355270 B1 | 7/1991 |
| WO | 0159501 A1 | 8/2001 |
| WO | 0181807 A1 | 11/2001 |

\* cited by examiner

CABLE BUSHING

BACKGROUND OF THE INVENTION

Field of the Invention

The invention relates to a cable bushing, in particular for a motor vehicle, for routing a cable harness having a plurality of electrical lines through a wall opening in a sealed manner.

DE 35 44 785 A1 discloses a sealing system that is suitable for a wall bushing for lines. The sealing system comprises a receiving body that is embodied from an elastic material that is compressed by two shell segments that in the fitted state act as a tensioning frame in order to achieve a moisture-tight contact of the receiving body against the lines. The receiving body comprises a dimensionally stable elastic block of rubber or a material similar to rubber. Through-going holes are provided in this block for the lines. Slits lead from the through-going holes to the exterior face of the receiving body. As a consequence, the receiving body can be opened slightly in order to receive the lines. As the shell segments that enclose the receiving body are placed in position, the receiving body is compressed so that all the gaps in the receiving body are closed.

DE 697 14 720 T2 discloses a seal for an aperture closure, in which a sealing element is arranged between pressure plates and the lines are individually routed through the pressure plates and the sealing element.

BRIEF SUMMARY OF THE INVENTION

The object of the invention is to provide a cable bushing that is improved with respect to its impermeability to longitudinal water penetration.

The object is achieved in accordance with the invention by means of a cable bushing, in particular for a motor vehicle, for the sealed routing of a cable harness having a plurality of electrical lines through a wall opening, said cable bushing comprising a dimensionally stable housing for inserting into the wall opening, which housing encloses a sealing element that is embodied as a pre-manufactured unit from an elastic sealing material, wherein receiving devices are provided in the sealing element for individually routing the electrical lines in an axial direction. Furthermore, a pressure-providing element is provided that exerts a compressive force on the sealing element in such a manner that the sealing material expands in the radial direction in a perpendicular manner with respect to the axial direction, in other words said sealing material is displaced radially outwards. As a consequence, it is achieved that the electrical lines are individually enclosed in a sealed manner by the sealing material and simultaneously the sealing element is preferably pressed in a radial manner against the housing.

In addition, the pressure-providing element comprises pins that protrude into the holes in the sealing element and namely in such a manner that a radial compressive force is exerted by way of said pins on the sealing material of the sealing element in the region of the holes and said force at least contributes to the sealing element being pressed in a radial manner against the housing.

For this purpose, the pins are preferably oversized with respect to the holes, in other words they comprise a larger diameter, as a consequence of which it is ensured that the pins are sealed in the sealing element.

The sealing element is, for example, axially fixed by means of the pins of the pressure-providing element, in particular the two parts of the sealing element can be mutually connected by way of the pins.

In addition to providing the function of radial expansion, the pins are also used for the precise (rotational) positioning of the pressure-providing elements with respect to the sealing element and said pins have advantages during the assembly process.

In accordance with a first preferred variant, the pins extend in the axial direction. In particular, two pressure plates are provided as pressure-providing elements that enclose between themselves the sealing element. Each pressure plate preferably comprises pins that protrude into the sealing element, in particular the pins of the opposite-lying pressure plates align with one another. The pins extend in each case only a part way into the sealing element. It is preferred that the pressure plates are not mutually connected.

In accordance with a second variant, the pins extend in a plane that is perpendicular with respect to the axial direction. The pressure-providing elements are expediently embodied as clamps that extend around the periphery of the pressure-providing element in such a manner that a plurality of pins are inserted into the pressure-providing element from several sides. This embodiment can be used alternatively or in addition to the pressure plates that exert a pressure on the pressure-providing element at the end face.

In accordance with a preferred embodiment variant, the housing comprises a peripheral surface that is provided with openings for the pins and the clamps lie outside the housing against the peripheral surface. As a consequence of the fact that the clamps, i.e. that the pressure-providing element is arranged outside the housing, the radial expansion of the sealing element is only limited by the housing, so that a good sealing arrangement is provided between the sealing element and the housing. As a consequence, it is also not necessary to seal the clamp with respect to the housing.

The cable bushing is conventionally mounted in the wall opening in a sealed manner by way of the housing. The housing comprises a mounting flange having a contact surface for contacting an edge of the opening and a circumferential seal that is in particular an O-ring for sealing the housing with respect to the wall opening. The dimensionally stable housing that is usually embodied as a dimensionally stable, synthetic material injection molded part is not only used for sealing the cable bushing with respect to the wall opening. On the contrary, it is also used to support the pressure-providing element, wherein the housing forms in particular a counter bearing so that the pressure-providing element can exert its compressive force on the prefabricated in particular cylindrical sealing element that is embodied from the resilient sealing material. The compressive force causes the sealing material of the sealing element to expand, so that the sealing element is pressed in the radial direction against the housing and in addition the sealing material encloses the electrical lines individually in a sealed manner. The cable harness is sealed in a manner that is based on the elastic sealing material expanding in a defined manner by means of which expansion not only are the electrical lines reliably sealed but water is also prevented from penetrating the contact region between the sealing element and the housing. Consequently, it is sufficient in the case of a cable bushing that is embodied in this manner merely to insert the cable busing into the wall opening and to seal said cable bushing with respect to the wall opening by way of the O-ring.

The cable bushing is therefore a prefabricated component that, together with the enclosed cables, forms in particular a pre-assembled cable set in which, for example, male connectors are attached at the end face to the lines. The individual components of the cable bushing, such as the sealing element, the pressure-providing element, the housing, are likewise prefabricated, separate individual components that are in particular mutually connected in a releasable manner, so that it is possible to repair or replace defective components or lines. It is therefore not necessary to pour a sealing mass into the housing in order to create the sealing element. The sealing material of the sealing element is overall preferably rubbery-elastic and is, for example, expanded rubber, a (thermoplastic) elastomer or a (silicone) rubber.

In order to be able to insert the electrical lines in a particularly simple manner individually into the receiving devices, the sealing element comprises preferably a separating site that extends over the entire length of the sealing element in such a manner that the individual electrical lines can be introduced into the sealing element by way of the separating site in a perpendicular manner with respect to the axial direction, in other words laterally and at least almost in the radial direction. In the case of this embodiment of the sealing element, it is not necessary to push the individual electrical lines through, but rather the lines are inserted into the receiving devices by way of the at least one separating site that extends between the two end faces of the sealing element. The electrical lines are thus introduced in a perpendicular manner, in other words laterally with respect to the axial direction and not in the axial direction as is the case when pushing through the electrical lines. In the possible event of components of the cable bushing becoming defective, said defective components can be dismantled in a non-destructive manner for repair purposes.

In accordance with a preferred embodiment, the pressure-providing element comprises two opposite-lying parts that are mutually connected in particular in a form-locking manner. It is ensured by means of the two opposite-lying parts of the pressure-providing element that the compressive force is exerted on the sealing element from at least two opposite directions. The pressure-providing element acts, for example, on the two end faces of the sealing element. Alternatively, the two parts of the pressure-providing element extend around the periphery of the sealing element. The parts of the pressure-providing element are preferably mutually connected in a form-locking and releasable manner, for example by way of a latching connection or snap-in connection. If it is necessary to dismantle the cable bushing, the pressure-providing element can consequently be disassembled in a rapid manner.

A plurality of separating sites is provided with a view to introducing the electrical lines into the receiving devices in a particularly simple manner; said separating sites are embodied as slits around the periphery of the sealing element and extend therefrom as far as the receiving devices. The slits are preferably merely embodied as cuts that are not open across the width of the slit, so that the edge faces of the slits lie directly one against the other. The electrical lines are pushed through the slits into the receiving devices from outside the sealing element. A good sealing arrangement is achieved around the slits by virtue of the fact that the slits preferably extend outwards in an inclined manner in a radially outwards direction and are in particular curved. As a consequence, the slits are reliably closed in a sealed manner as soon as a resulting radial force is exerted by way of the pressure-providing element, which radial force causes the sealing material to expand in the radial direction.

In accordance with a preferred variant, the pressure-providing element comprises two pressure-providing plates that lie at the end face against the sealing element. The pressure-providing plates exert at the end face a compressive force over a large surface area on the pressure-providing element, as a consequence of which the pressure-providing element expands in the radial direction. The process of generating a radial force component is supported by virtue of the fact that the contact surfaces of the sealing element and of the pressure-providing plates are embodied in a suitable manner. It is preferred that the pressure-providing element or the sealing element selectively or in combination comprise at least one region of a pressure-providing surface that is arranged in an inclined manner with respect to the axial direction in such a manner that as a consequence as the sealing element is compressed in the axial direction, a force component that acts in the radially outwards direction is produced. This is achieved structurally by virtue of the fact that the pressure-providing element for example is embodied in a convex manner. In addition thereto, the end faces of the sealing element are in particular embodied in a concave manner.

The surface pressure on the housing is increased by means of the radially expanded sealing element, by virtue of the fact that the sealing element is preferably profiled on the peripheral surface and the peripheral surface of the sealing element is reduced by means of this profiling. The profiling is, for example, embodied in the manner of one or more grooves that extend around the periphery of the sealing element.

In order that the pressure-providing plates exert pressure over a large as possible area on the pressure-providing element, the diameter of said pressure-providing plates is approximately as large as that of the sealing element. In order to be able to route the electrical lines that are routed through the sealing element also through the pressure-providing plates, the pressure-providing plates have in accordance with a preferred embodiment cutouts on the peripheral surface for the electrical lines, wherein the cutouts are embodied in particular for engaging behind the lines and for receiving said lines in a loss-proof manner and said cutouts are embodied, for example, in an L-shape. Once the electrical lines are inserted into the L-shaped cutouts, the pressure-providing plates are rotated slightly in particular in opposite directions, as a consequence of which the electrical lines are prevented from falling out.

In order that at least one of the pressure-providing plates can be supported in an axial manner on the housing, the housing comprises advantageously a stop, the diameter of which is smaller than the diameter of the pressure-providing plates. An axial counter bearing is likewise required for the opposite-lying pressure-providing plate, in particular if the two pressure-providing plates are not mutually connected, which counter bearing is attached to the housing, for example, after the pressure-providing plates have been assembled in the housing. For this purpose, an annular locking element is preferably provided. Said annular locking element can be connected to the housing in particular in a form-locking and releasable manner and as a consequence said annular locking element exerts an axial force on the pressure-providing element and/or on one of the pressure-providing plates. The connection in this case is in particular performed in the manner of a bayonet closure. Consequently, the locking element forms a second axial stop for one of the pressure-providing plates. The locking element is connected to the housing in a pre-defined position, as a consequence of which the relative position between the housing and the locking element is locked in the axial direction, so that a pre-defined contact pressing force acts in the axial direction on the contacting pressure-providing plate. The locking element is, for example, a locking element that has a narrowed neck, the diameter of which is smaller than the diameter of the pressure-providing plates. It is particularly advantageous when using the locking element that no additional components, for example screws, flat washers or threaded inserts are required. The locking element and the housing are connected in particular by way of a bayonet closure. Alternatively, snap-in hooks that latch into the housing are provided, for example, on the locking closure. The structural length of the snap-in hooks ensures that the sealing element is compressed by way of the sealing plates.

As an alternative to the slits, the separating site is formed in accordance with a further preferred variant by means of at least one separating plane and the sealing element comprises two or more sealing bodies that lie one against the other, wherein channels are provided at least in one sealing body and when the sealing element is in the assembled state, said channels form the receiving devices for the electrical lines. The channels that are arranged adjacent to one another extend in each case in the axial direction and lie in the separating plane. The channels therefore span said separating plane. Consequently, a plurality of electrical lines is routed each line adjacent to the other in the separating plane. The channels are radially open, so that the electrical lines are inserted into the channels without any great expenditure. The channels are only closed once two or more sealing bodies have been joined together, as a consequence of which the receiving devices are formed for the electrical lines.

The process of assembling the electrical lines is simplified by virtue of the fact that channels are advantageously embodied in such a manner as to receive the lines in a loss-proof manner and for this purpose said channels have in each case an undercut as seen in the cross-sectional view, so that the individual lines are encompassed partially by the sealing material. The lines that have already been inserted into the channels are thus held in their position in a loss-proof manner as long as other lines are pushed into the channels provided for said other lines.

The electrical lines are particularly efficiently sealed in the receiving devices along their length if the channels preferably become narrower in one region. A particularly high level of surface area pressure is applied to the site of the narrowed portion in order to seal the lines. The narrowed portion can also be embodied as a web that extends in a transverse manner with respect to the axial direction and fully blocks the channels. The elastic sealing material in the region of the web is pushed away as the lines are inserted into the channels.

In order to enhance the sealing arrangement between the sealing element and the housing, at least one bead-like thickening is embodied about the periphery of the sealing element, in particular in the region of the holes, and this thickened region is compressed when the cable bushing is in the assembled state. Said thickened region is also preferably provided in the case of the variant that comprises pressure-providing plates that are arranged at the end face.

The subordinate claims disclose embodiments that in some cases are themselves distinct and inventive, independent of the structural arrangement of the pins in accordance with the independent claim(s). The right is reserved to file a divisional application(s) relating to combinations of subordinate claims with the independent claim(s) without the feature of the structural arrangement of the pins.

Exemplary embodiments of the invention are explained in detail with reference to a drawing, in which.

BRIEF DESCRIPTION OF THE SEVERAL VIEWS OF THE DRAWING

DESCRIPTION OF THE INVENTION

Like reference numerals have the identical meaning in the different figures.

Figure 1:
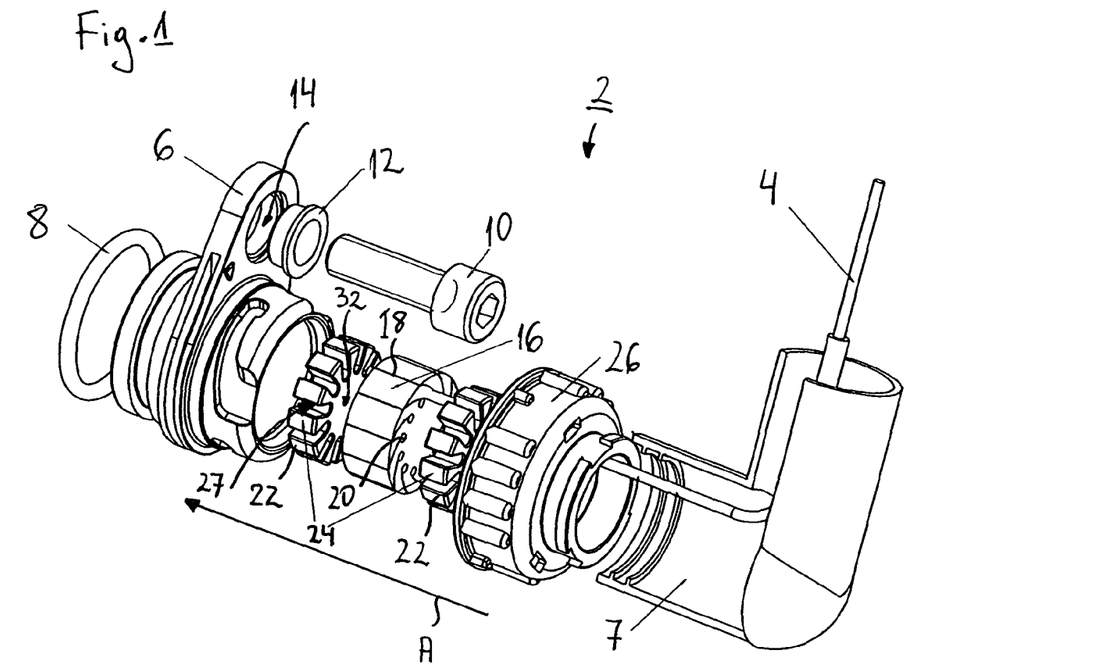
FIG. 1 shows an exploded view of a first embodiment variant of a cable bushing.
Figure 2:
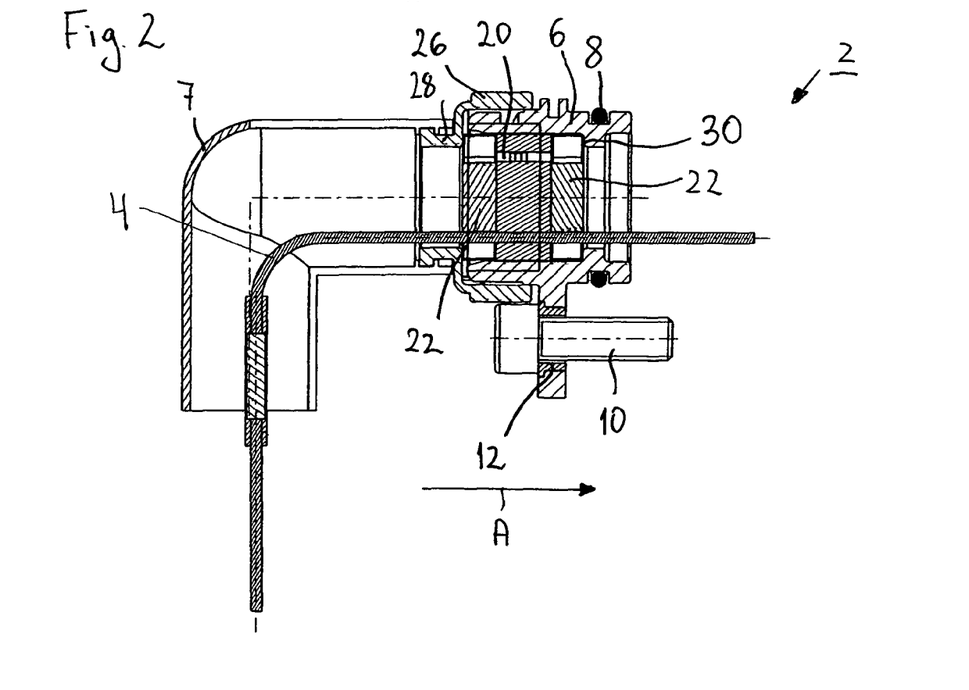
FIG. 2 shows an axial sectional view through the assembled cable bushing as shown in FIG. 1.

FIGS. 1 and 2 illustrate a first embodiment variant of a cable bushing 2 for routing a cable harness through a wall opening in a sealed manner. The cable harness comprises a plurality of electrical lines 4 of a cable harness 5 (cf. FIG. 7) and for the sake of clarity only one of said electrical lines is illustrated in FIGS. 1 and 2 and this one electrical line is identified by the reference numeral 4. A protective cap 7 is provided in order to protect the electrical lines 4 outside the cable bushing 2.

The cable bushing 2 comprises a dimensionally stable housing 6 for inserting into the wall opening. An 0-ring 8 is provided in order to seal the housing 6 with respect to the wall opening. The housing 6 comprises a flange-like stop for contacting an edge of the wall opening. The cable bushing 2 is mounted on the wall by means of a screw 10 that is guided with the aid of a bush 12 through an eyelet 14 in the housing 6.

The cable bushing 2 comprises in addition a sealing element 16 that in this exemplary embodiment is a one-piece, solid, cylindrical body embodied from an elastic sealing material, for example rubber. A plurality of slits 18 that extend in the axial direction A are embodied around the periphery of the sealing element 16 and said slits extend in the axial direction A in each case as far as a cylindrical receiving device 20 for individually routing the electrical lines 4. The receiving devices 20 form accordingly a concentric circle not far from the peripheral surface of the sealing element 16. The slits 18 as viewed in the cross-section are curved. The electrical lines 4 are pushed in by way of the slits 18 in a perpendicular manner with respect to the axial direction A as far as the receiving devices 20.

A pressure plate 22 lies in each case against each of the two end faces of the sealing element 16, wherein the pressure plates 22 are part of a two-piece pressure-providing element 24 with the aid of which a compressive force is exerted on the sealing element 16. In the illustrated exemplary embodiment, the compressive force is exerted on the pressure-providing element 24 by means of a locking element 26 that is fixedly connected by way of a bayonet closure to the housing 6. The locking element 26 and the pressure-providing plates 22 are firm and dimensionally stable components.

The pressure-providing plates 22 comprise around their periphery a plurality of cutouts 27 through which the electrical lines are routed. The number of cutouts corresponds to the number of receiving devices 20 in the sealing element 16. The cutouts 27 are preferably embodied in an L-shape as viewed in the cross-section, so that the electrical lines 4 are prevented from falling out during the assembly process (cf. FIG. 4A, 4B). For this purpose, the pressure-providing plates 22 are rotated with respect to each other.

Figure 5:
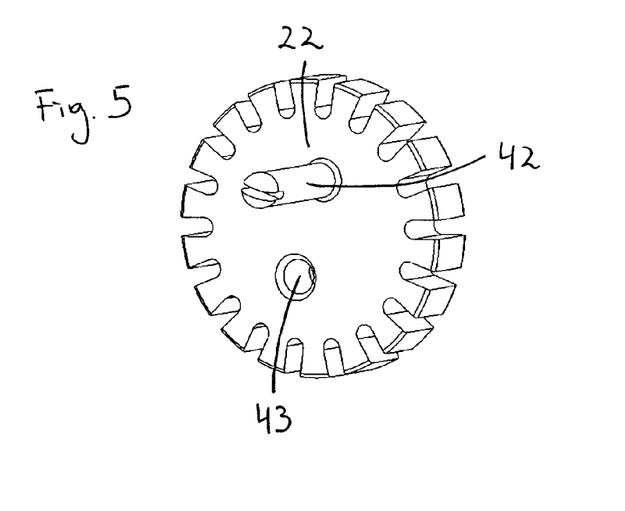
FIG. 5 shows a perspective view of a pressure-providing plate having a pin and a latch receiving device.

The pressure-providing plates 22 preferably comprise pins 42 as is illustrated by way of example in FIG. 5. In particular, each pressure-providing plate 22 comprises a plurality of pins, for example two, three or more pins. Said pins penetrate preferably on each side into in each case a common hole 41 (cf. FIG. 3) of the sealing element 16.

Figure 3:
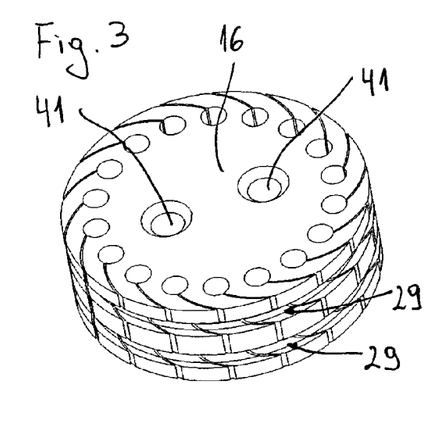
FIG. 3 shows a perspective view of a sealing element having grooves that are provided on the peripheral surface.

The diameter of the pins 42 is greater than that of the allocated hole 41, so that the sealing material is urged in the radial direction and as a consequence the level of impermeability to longitudinal water penetration is improved.

In order to increase the surface pressure of the sealing element 18 with respect to the housing 6, the sealing element 16 can comprise around its periphery a profiling in the manner of one or more grooves 29 (cf. FIG. 3).

Figure 4A:
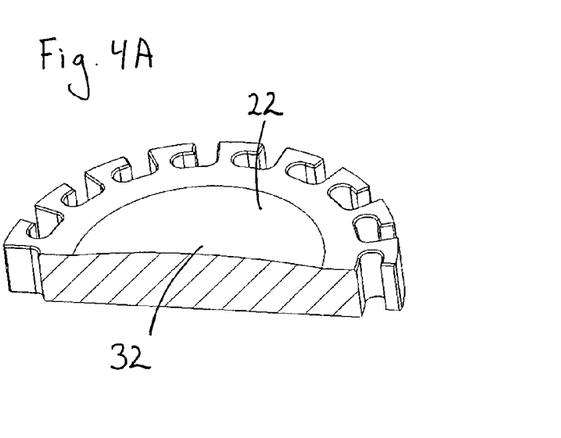
FIG. 4A-C show a perspective sectional view of a pressure-providing plate in different variants (FIG. 4A, 4B) and/or a sealing element (FIG. 4C) having inclined, in particular curved, end face regions of pressure-providing surfaces.
Figure 4B:
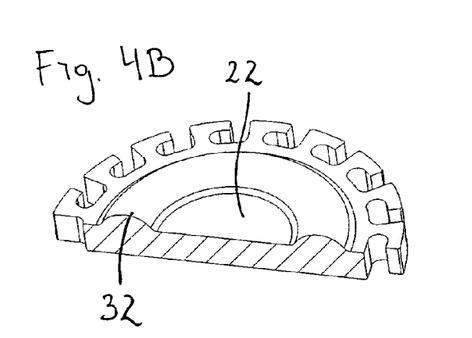
Figure 4C:
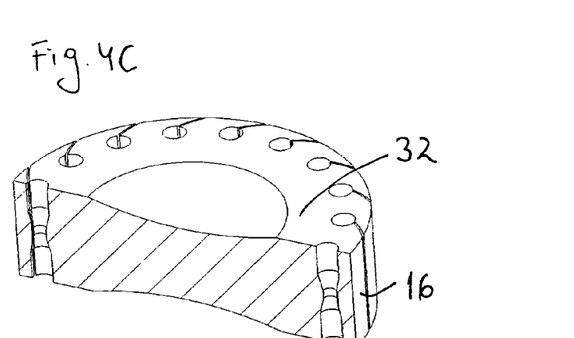

As shown in FIG. 1, the end faces of the sealing element 16 are planar in a transverse plane that is transverse with respect to the axial direction A. The faces of the pressure-providing plates 22 that lie against the sealing element 16 are also embodied in a planar manner. It is possible, however, to generate radial force components of the compressive force on the sealing element 16 by virtue of the fact that a region 32 of a pressure-providing surface of the pressure-providing plates 22 or the end face of the sealing element 16 is inclined at an angle with respect to the axial direction A, for example they are embodied in a convex manner. Examples of this are illustrated in FIGS. 4A, 4B, 4C. If the region 32 of a pressure providing surface of the pressure-providing plates 22 is convex, the end faces of the sealing element 16 can in addition be concave. The convex region 32 of the pressure-providing surface is, for example, embodied in the manner of a central elevation in the end faces, said region can, however, also extend in an annular manner on the end face.

The locking element 26 comprises a narrowed neck 28, the diameter of which is smaller than that of the pressure-providing surface plates 22. The neck 28 forms an axial stop for one of the pressure plates 22. A further stop 30 is embodied in the housing 6 for the second pressure-providing plate 22, so that the position of the second of a pressure-providing surface plate 22 is fixed in the housing 6. The diameter of the stop 30 is smaller than a diameter of the pressure plates 22.

An axial force is generated by virtue of connecting the locking element 26 to the housing 6 since the locking element 26 presses on the pressure-providing plate 22 that is lying thereon. This compressive force is introduced into the sealing element 16 by way of the pressure plates 22. This compressive force causes the sealing material of the sealing element 16 to expand radially so that the sealing element is pressed against the housing 6 and in addition the individual electrical lines that are routed through the receiving devices 20 in the sealing element 16 are enclosed in a sealed manner by the sealing material. The magnitude of the compressive force is defined by the position of the annular locking element 26 with respect to the housing 6.

As an alternative to the bayonet closure, the locking element 26 can be connected to the housing 6 by way of snap-in hooks that latch in the housing 6. The compressive force depends in particular on the length of the snap-in hook.

The pressure-providing plates 22 comprise in each case— as illustrated in FIG. 5—preferably axially extending pins 42 that are guided through axial holes 41 in the sealing element 16 (cf. FIG. 3). For example, only one of the pressure-providing plates 22 comprises axial pins that are approximately as long as the width of the sealing element 16 in the axial direction A, and the other pressure-providing plate comprises receiving devices, for example latch receiving devices 43, for the end of the pins. This embodiment is also used in addition to compressing the sealing element 16 as an aid in the assembly process. In the case of the variant illustrated in FIG. 5, each of the pressure-providing plates 22 comprises a pin 42 and a latch receiving device 43.

Figure 6:
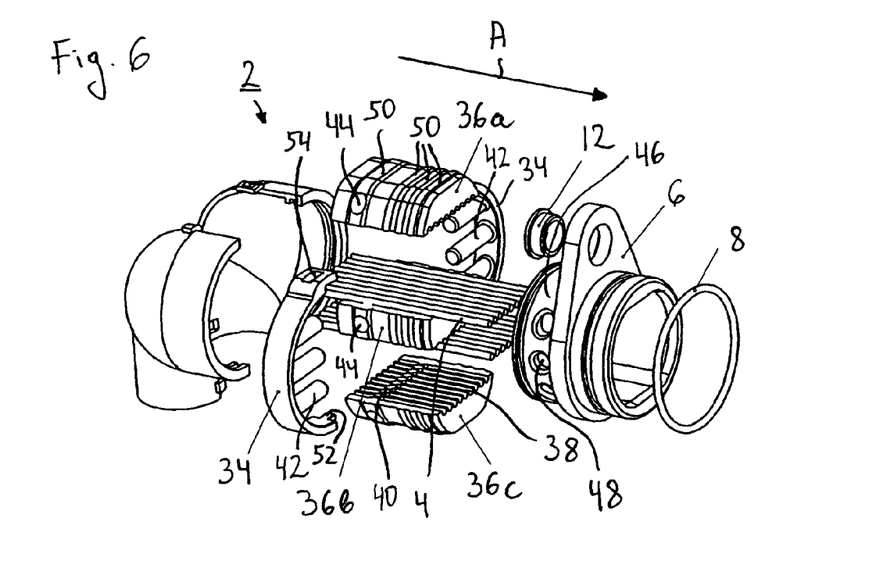
FIG. 6 shows an exploded view of a second embodiment variant of a cable bushing.
Figure 7:
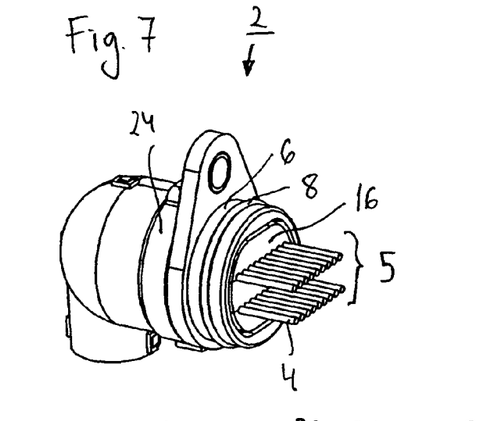
FIG. 7 shows a perspective view of the cable bushing as shown in FIG. 6 in the assembled state.
Figure 8:
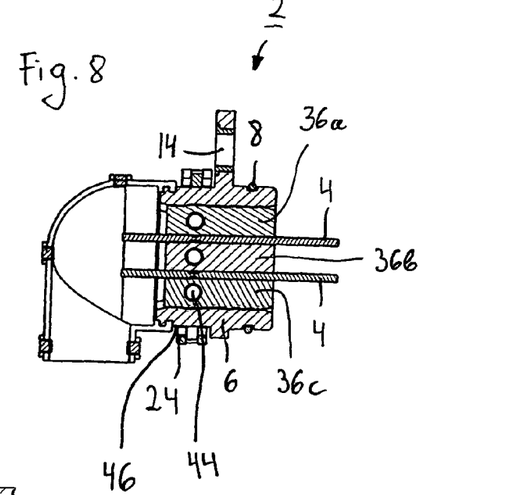
FIG. 8 shows an axial sectional view through the cable bushing as shown in FIG. 7.
Figure 9:
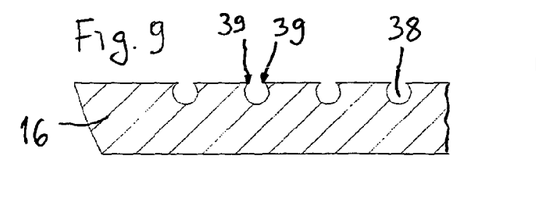
FIG. 9 shows a schematic cross-sectional view through a sealing element of a cable bushing as shown in FIG. 6 to FIG. 8.

The second embodiment variant of the cable bushing 2 as shown in FIGS. 6 to 8 differs from the first embodiment variant by virtue of the fact that the pressure-providing element 24 comprises two clamps 34 that are arranged around the sealing element 16. In addition, the sealing element 16 is divided into two parallel separating planes, so that the sealing element 16 comprises three sealing bodies 36a, 36b and 36c. Channels 38 are embodied in each of the sealing bodies 36a, 36b, 36c, which channels extend in the axial direction A over the entire length of the sealing bodies 36a, 36b, 36c. The channels 38 are open in the radial direction, so that the electrical lines 4 can be inserted into said channels. The channels 38 on a central sealing body 36b comprise in addition undercuts 39 that are illustrated in FIG. 9. When the electrical lines 4 are inserted into the channels 38, said electrical lines are engaged from behind by the sealing material through the undercuts 39. As a consequence, the lines 4 that are routed along the central sealing body 36b and in particular the lines 4 on the lower face of the central sealing body 36b are prevented from falling out during the process of assembling the cable bushing 2.

The two outer sealing bodies 36a, 36c comprise in one region a narrowed portion 40 of the channels 38 by means of which the electrical lines 4 are axially fixed in the assembled state.

As the two outer sealing bodies 36a, 36c are placed on the central sealing body 36b, the sealing material encloses the lines 4 individually in the receiving devices 20 that are embodied by means of the channels 38 on the central sealing body 36b and by means of the corresponding channels 38 on the outer sealing bodies 36a, 36c inside the sealing element 16. As the sealing body 16 comprises two part planes, the lines 4 of the cable harness 5 are divided into two planes that extend in parallel with respect to each other. In the case of a sealing element 16 that is assembled from more than three sealing bodies 36a, 36b, 36c, the number of planes of lines 4 is correspondingly greater.

In the second exemplary embodiment, pins 42 that protrude inwards from the clamps 34 and extend in a perpendicular manner with respect to the axial direction A are used to expand the sealing material of the sealing element 16. Holes 44 for the pins 42 are provided in the sealing bodies 36a, 36b, 36c, wherein the pins 42 are oversized with respect to the holes 44, so that the pins 42 exert a compressive force on the sealing element 16 if said pins are inserted into the holes 44. The sealing element 16 can expand both in the axial direction and in the radial direction by means of this compressive force, so that said sealing element is pressed against the housing 6.

The two clamps 34 of the pressure-providing element 24 are not mounted directly on the sealing element 16 but rather they lie against a peripheral surface 46 of the housing 6. The peripheral surface 46 of the housing 6 is provided for this purpose with openings 48 for the pins 42. The clamps 34 are releasably mutually connected to embody the pressure-providing element 24. The connection is in particular form-locking and is achieved by way of a latching protrusion 52 that latches into a latch receiving device 54 of the respective other clamp 34.

With a view to achieving a particularly good sealing arrangement in the radial direction between the sealing element 16 and the housing 6, the sealing element 16 comprises a plurality of bead-like thickened regions 50 around its periphery. One of these thickened regions 50 is located in the region of the holes 44. If the sealing element 16 is enclosed by the housing 6 and the pins 42 are inserted into the holes 44, the sealing element 16 lies in the region of the thickened regions 50 in a particularly sealed manner on the housing 6.

A cable bushing 2 is characterized in the two described embodiment variants by the fact that the cable bushing 2 is sealed in a particularly efficient manner by virtue of the fact that the elastic sealing element 16 is expanded in a radial direction and as a result is pressed against the housing 6. The difference between the two embodiment variants resides essentially in the fact that in the case of the first variant the pressure-providing element 24, by means of which the compressive force is introduced into the sealing element 16, acts in an axial direction on the end faces of the sealing element 16 and in the case of the second embodiment variant the compressive force is introduced into the inside of the sealing element 16 by way of the pins 42. Due to the pressure-providing element 24 being arranged in a different manner with respect to the sealing element 16, the sealing element 16 is also embodied in a different manner in the two embodiment variants. In the first embodiment variant, said sealing element comprises on its periphery axially extending separating sites that are embodied as slits 18 in order to provide the receiving devices 20 for the lines 4. In the second embodiment variant, the separating sites are embodied by means of two separating planes, so that the sealing element 16 is embodied in three parts.

In the case of the two embodiment variants, the lines 4 are, however, inserted in a simple manner into the receiving devices 20 in a perpendicular manner with respect to the axial direction A. In addition, the cable bushings 2 can be dismantled in a rapid and simple manner in the event of a malfunction.

LIST OF REFERENCE NUMERALS

2 Cable bushing
4 Electrical line
5 Cable harness
6 Housing
7 Protective cap
8 O-ring
10 Screw
12 Bush
14 Eyelet
16 Sealing element
18 Slit
20 Receiving device
22 Pressure-providing plate
24 Pressure-providing element
26 Locking element
27 Cutouts
28 Neck
29 Grooves
30 Stop
32 Region of a pressure-providing surface
34 Clamp
36a,b,c Sealing body
38 Channel
39 Undercut
40 Narrowed portion
41 Hole
42 Pin
43 Latch receiving device
44 Hole
46 Peripheral surface
48 Opening
50 Thickened region
52 Latching protrusion
54 Latching receiving devices
A Axial direction

The invention claimed is:

1. A cable bushing for providing sealed routing of a cable harness having a plurality of electrical lines through an opening, the cable bushing comprising:
a dimensionally stable housing for being inserted into the opening;
a sealing element of elastic sealing material enclosed by said housing and having an opening:
a plurality of receiving devices disposed in said sealing element for individually routing the electrical lines in an axial direction;
a pressure-providing element for exerting a compressive force on said sealing element such that the sealing material is displaced in a radially outward direction; and
said pressure-providing element including pins to be engaged in the openings for displacing the sealing material in the radially outward direction, said openings and said pins extending perpendicular with respect to the axial direction.

2. The cable bushing according to claim 1, wherein said pins are oversized with respect to the opening.

3. The cable bushing according to claim 1, wherein said pressure-providing element has two clamps that enclose said sealing element at a peripheral surface.

4. The cable bushing according to claim 3, wherein said housing has a peripheral surface with openings, and said clamps lie against said peripheral surface.

5. The cable bushing according to claim 1, wherein said sealing element has at least one separating site that extends over an entire length of said sealing element, such that individual electrical lines are inserted perpendicularly into the sealing element through the separating site with respect to the axial direction.

6. The cable bushing according to claim 1, wherein said sealing element has two opposite-lying parts.

7. The cable bushing according to claim 1, wherein said sealing element has a plurality of separating sites configured as slits that extend from a periphery of the sealing element to the receiving devices.

8. The cable bushing according to claim 7, wherein said slits are curved and extend toward said receiving devices in a radial incline.

9. The cable bushing according to claim 1, wherein at least one of said pressure-providing element and said sealing element comprise a region that is a pressure-providing surface inclined with respect to the axial direction such that the sealing element compresses in the axial direction to produce a radial outward force component.

10. The cable bushing according to claim 3, wherein said sealing element has profiling on the peripheral surface.

11. The cable bushing according to claim 3, wherein said pressure-providing element has pressure-providing plates with cutouts on the peripheral surface that engage electrical lines behind said lines.

12. The cable bushing according to claim 11, wherein said housing has a stop of a diameter smaller than a diameter of said pressure-providing plates.

13. The cable bushing according to claim 1, further including a locking element for locking connection to said housing such that an axial compressive force is exerted on said pressure-providing element to fix a relative position between said housing and said locking ring in the axial direction.

14. The cable bushing according to claim 5, wherein said at least one separating site has at least one separating plane that extends in the axial direction, said sealing element has at least two sealing bodies disposed against each other, and channels at least in one of said sealing bodies to enable said receiving devices to receive the electrical lines when said sealing element is assembled.

15. The cable bushing according to claim 14, wherein said channels have a cross-sectional undercut to enable said sealing material to partially encompass individual ones of the electrical lines.

16. The cable bushing according to claim 14, wherein said channels have a narrow portion.

17. The cable bushing according to claim 1, further including at least one bead-like thickened region about a periphery of said sealing element in the region of said holes.

* * * * *